US012519267B2

(12) United States Patent
Huang et al.

(10) Patent No.: US 12,519,267 B2
(45) Date of Patent: Jan. 6, 2026

(54) PROTECTION END COVER, CONNECTOR AND CONNECTOR ASSEMBLY

(71) Applicant: Tyco Electronics Technology (SIP) Ltd., Suzhou (CN)

(72) Inventors: Jianlin Huang, Suzhou (CN); Feng (Carlos) Pan, Suzhou (CN); Ky Zhu, Suzhou (CN)

(73) Assignee: Tyco Electronics Technology (SIP) Ltd., Suzhou (CN)

( * ) Notice: Subject to any disclaimer, the term of this patent is extended or adjusted under 35 U.S.C. 154(b) by 399 days.

(21) Appl. No.: 18/147,812

(22) Filed: Dec. 29, 2022

(65) Prior Publication Data

US 2023/0216236 A1 Jul. 6, 2023

(30) Foreign Application Priority Data

Dec. 31, 2021 (CN) ......................... 202111682070.6

(51) Int. Cl.

| | |
|---|---|
| ***H01R 13/52*** | (2006.01) |
| ***H01R 13/64*** | (2006.01) |
| ***H01R 13/6582*** | (2011.01) |
| ***H01R 13/6592*** | (2011.01) |

(52) U.S. Cl.

CPC ......... *H01R 13/5202* (2013.01); *H01R 13/64* (2013.01); *H01R 13/6582* (2013.01); *H01R 13/6592* (2013.01); *H01R 13/5213* (2013.01)

(58) Field of Classification Search

CPC ........................... H01R 13/5202; H01R 13/64; H01R 13/6582; H01R 13/6592; H01R 13/506; H01R 13/5213; H01R 13/5812; H01R 13/521; H01R 24/20; H01R 13/5205;

(Continued)

(56) References Cited

U.S. PATENT DOCUMENTS

| | | | | |
|---|---|---|---|---|
| 7,632,148 B1 * | 12/2009 | Kawamura | ............ | H01R 24/22 439/607.41 |
| 9,577,367 B2 * | 2/2017 | Campbell | .......... | H01R 13/5205 |
| 10,116,085 B1 * | 10/2018 | Quinteros | .......... | H01R 13/5825 |

(Continued)

FOREIGN PATENT DOCUMENTS

| | | |
|---|---|---|
| CN | 203553477 U | 4/2014 |
| CN | 110611199 A | 12/2019 |

OTHER PUBLICATIONS

Extended European Search Report from the European Patent Office dated May 31, 2023, corresponding to Application No. 22216951. 8-1201, 21 pages.

(Continued)

*Primary Examiner* — Briggitte R. Hammond
(74) *Attorney, Agent, or Firm* — Barley Snyder

(57) ABSTRACT

A protection end cover for a sealing ring includes a body having a first end insertable into an insertion hole of a housing of a connector and a second end positioned outside the housing, a first flange on a first outer peripheral surface of the first end of the body, and a second flange on a second outer peripheral surface of the second end of the body. The first flange engages with a blocking part of the housing to prevent the protection end cover from being pulled out of the insertion hole. The second flange abuts against an outer end surface of the housing to limit the protection end cover at a predetermined insertion position.

17 Claims, 7 Drawing Sheets

(58) Field of Classification Search
CPC .............. H01R 13/5208; H01R 13/502; H01R 13/6591; H01R 13/6584
See application file for complete search history.

(56) References Cited

U.S. PATENT DOCUMENTS

| | | | | |
|---|---|---|---|---|
| 10,601,172 | B2 * | 3/2020 | Misu | H01R 13/5812 |
| 11,050,192 | B2 * | 6/2021 | Qiu | H01R 13/639 |
| 2011/0315442 | A1 | 12/2011 | Nolting et al. | |
| 2015/0295346 | A1 | 10/2015 | Campbell et al. | |
| 2019/0356087 | A1 | 11/2019 | Pamart | |
| 2020/0194938 | A1 | 6/2020 | Jung et al. | |

OTHER PUBLICATIONS

European Patent Office Examination Report dated May 22, 2025, corresponding to Application No. 22 216 951.8-1201, 13 pages.

Chinese Office Action dated Jul. 22, 2025 with English translation, corresponding to Application No. 202111682070.6, 17 pages.

* cited by examiner

PROTECTION END COVER, CONNECTOR AND CONNECTOR ASSEMBLY

CROSS-REFERENCE TO RELATED APPLICATION

This application claims the benefit of the filing date under 35 U.S.C. § 119 (a)-(d) of Chinese Patent Application No. 202111682070.6, filed on Dec. 31, 2021.

FIELD OF THE INVENTION

The present invention relates to a sealing ring protection end cover for a connector cable, a connector including the sealing ring protection end cover, and a connector assembly including the connector.

BACKGROUND

A connector for a laser radar generally includes a housing, a signal terminal for transmitting a signal (for example, an Ethernet signal) provided in the housing, and a cable inserted into an insertion hole of the housing and electrically connected to the signal terminal. In order to realize a waterproof sealing function, it is usually necessary to set a sealing ring on the cable to realize the sealing between the cable and the housing.

In order to prevent the sealing ring from being pulled out from the insertion hole of the housing when pulling the cable, an end cap is required at the inlet of the insertion hole. In the prior art, the end cap is usually connected to one end of the housing by a screw connection. However, the manufacturing cost of the end cap and housing with threads is high, and also leads to an increase in connector volume.

SUMMARY

A protection end cover for a sealing ring includes a body having a first end insertable into an insertion hole of a housing of a connector and a second end positioned outside the housing, a first flange on a first outer peripheral surface of the first end of the body, and a second flange on a second outer peripheral surface of the second end of the body. The first flange engages with a blocking part of the housing to prevent the protection end cover from being pulled out of the insertion hole. The second flange abuts against an outer end surface of the housing to limit the protection end cover at a predetermined insertion position.

BRIEF DESCRIPTION OF THE DRAWINGS

The features of the present invention will become more apparent by describing in detail exemplary embodiments thereof with reference to the accompanying drawings, in which.

DETAILED DESCRIPTION OF THE EMBODIMENTS

Figure 1:
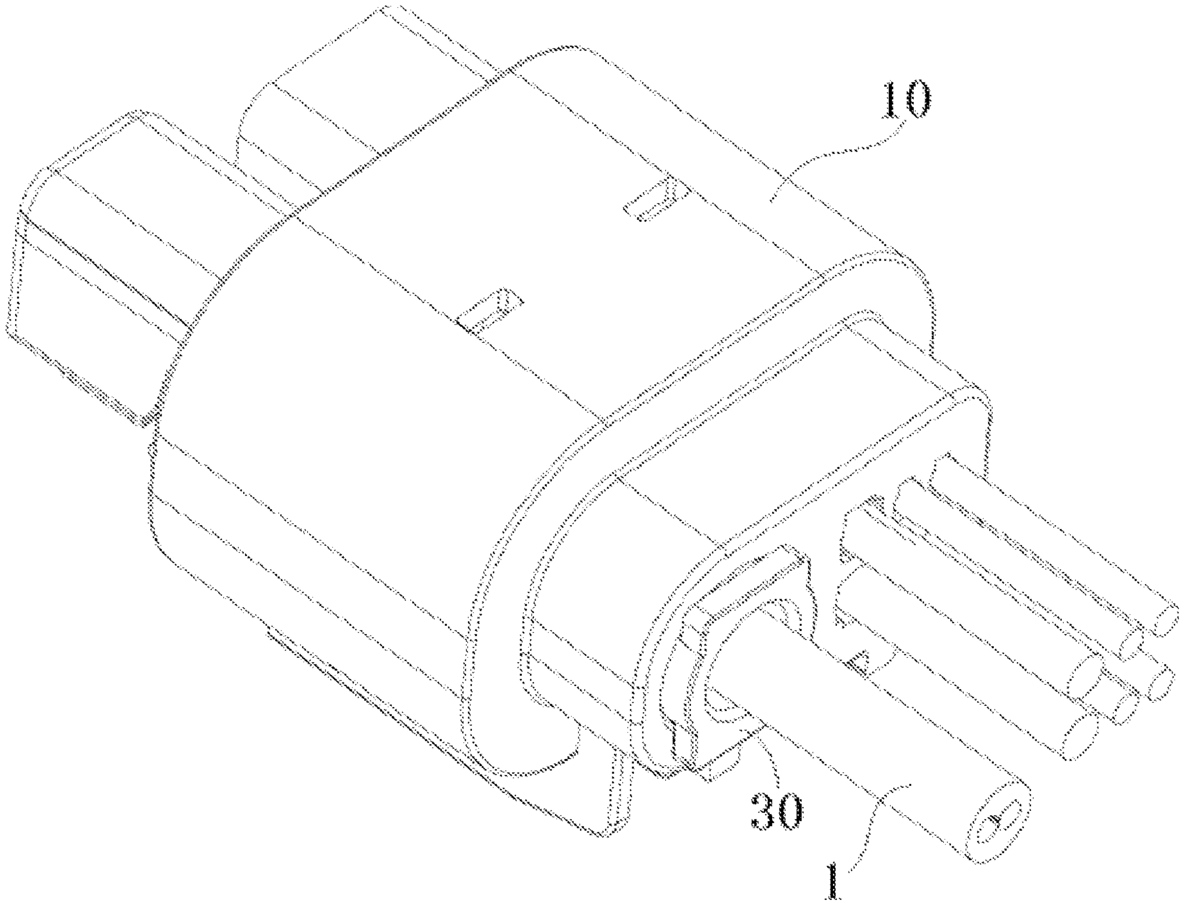
FIG. 1 is a perspective view of a connector according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
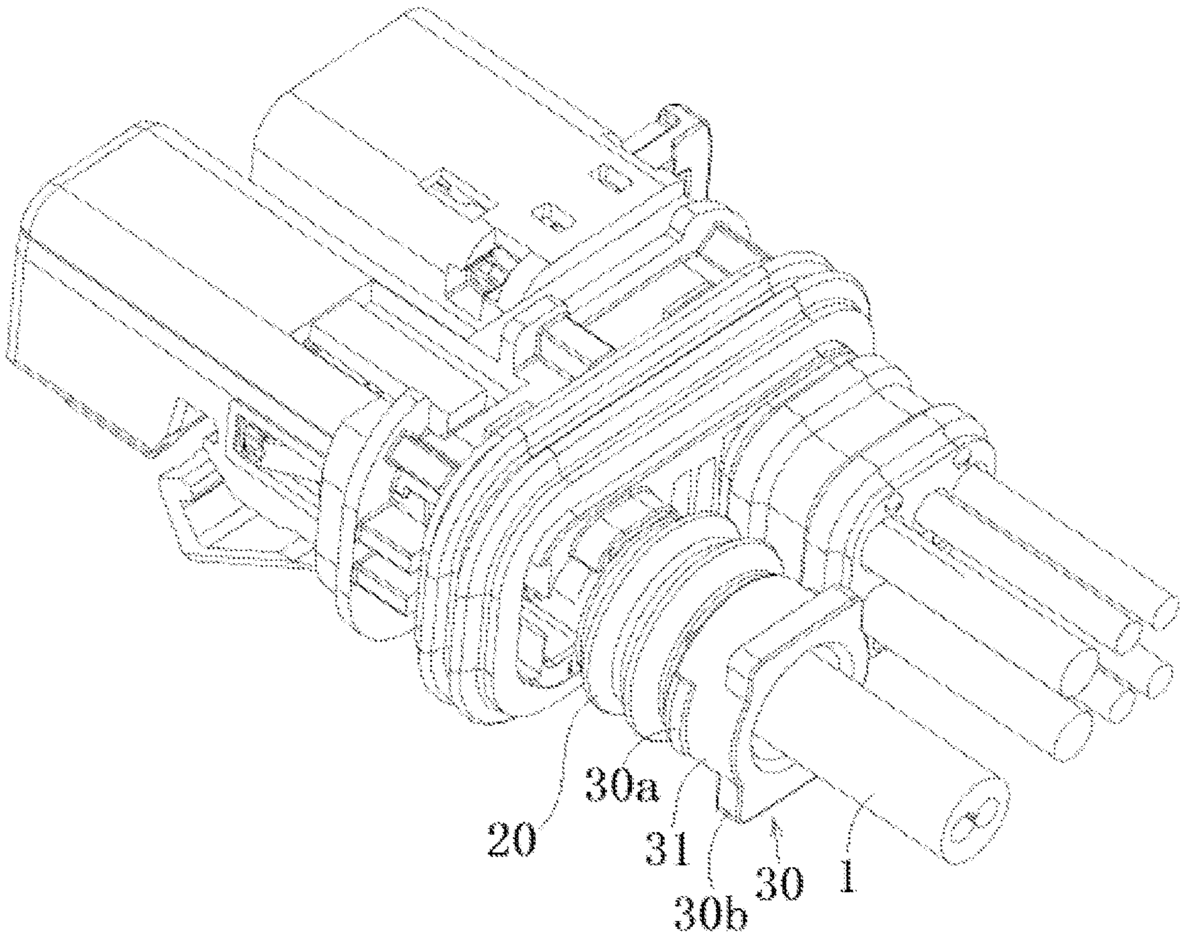
FIG. 2 is a perspective view of the connector with a housing removed.
Figure 5:
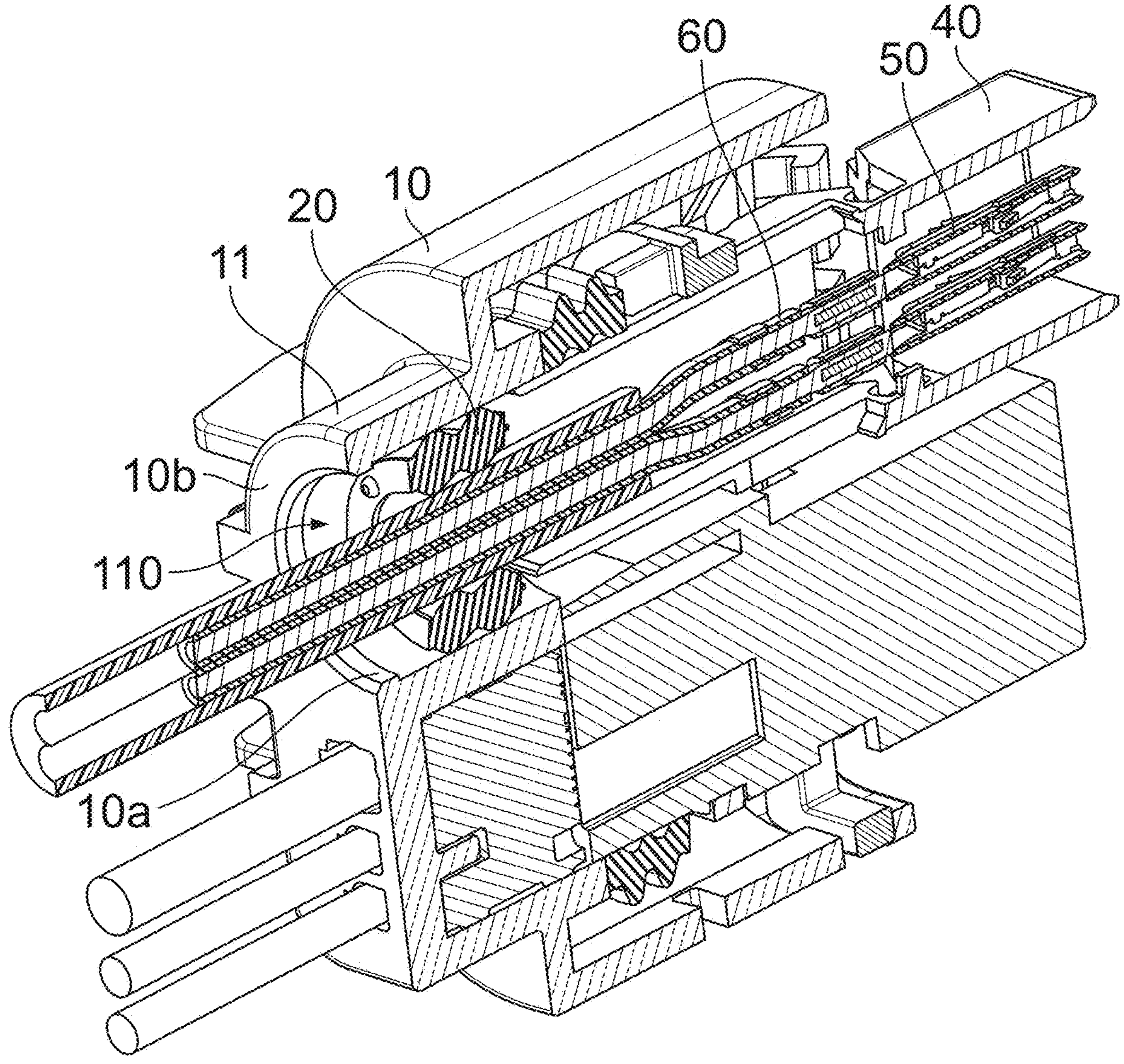
FIG. 5 is a sectional perspective view of the connector with a protection end cover removed.

As shown in FIGS. 1-2 and 5, in the illustrated embodiment, a connector suitable for connection with, for example, laser radar is disclosed, which can simultaneously transmit power and signals. The connector includes a housing 10, a sealing ring 20, and a protection end cover 30. The housing 10 is formed with an insertion hole 110 for accommodating the cable 1, as shown in FIG. 5. The sealing ring 20 is inserted into the insertion hole 110 of the housing 10.

As shown in FIG. 5, the insertion hole 110 extends to an outer end face 10*b* of the housing 10 to form an opening at the outer end face 10*b*. The protection end cover 30 is inserted into the opening of the insertion hole 110 and fixed to the housing 10. When the sealing ring 20 is moved toward the outer end face 10*b* of the housing 10 (i.e., when the cable 1 is pulled outward), the first end of the protective end cover 30 can abut against one end of the sealing ring 20 to prevent the sealing ring 20 from being pulled out from the insertion hole 110.

Figure 3:
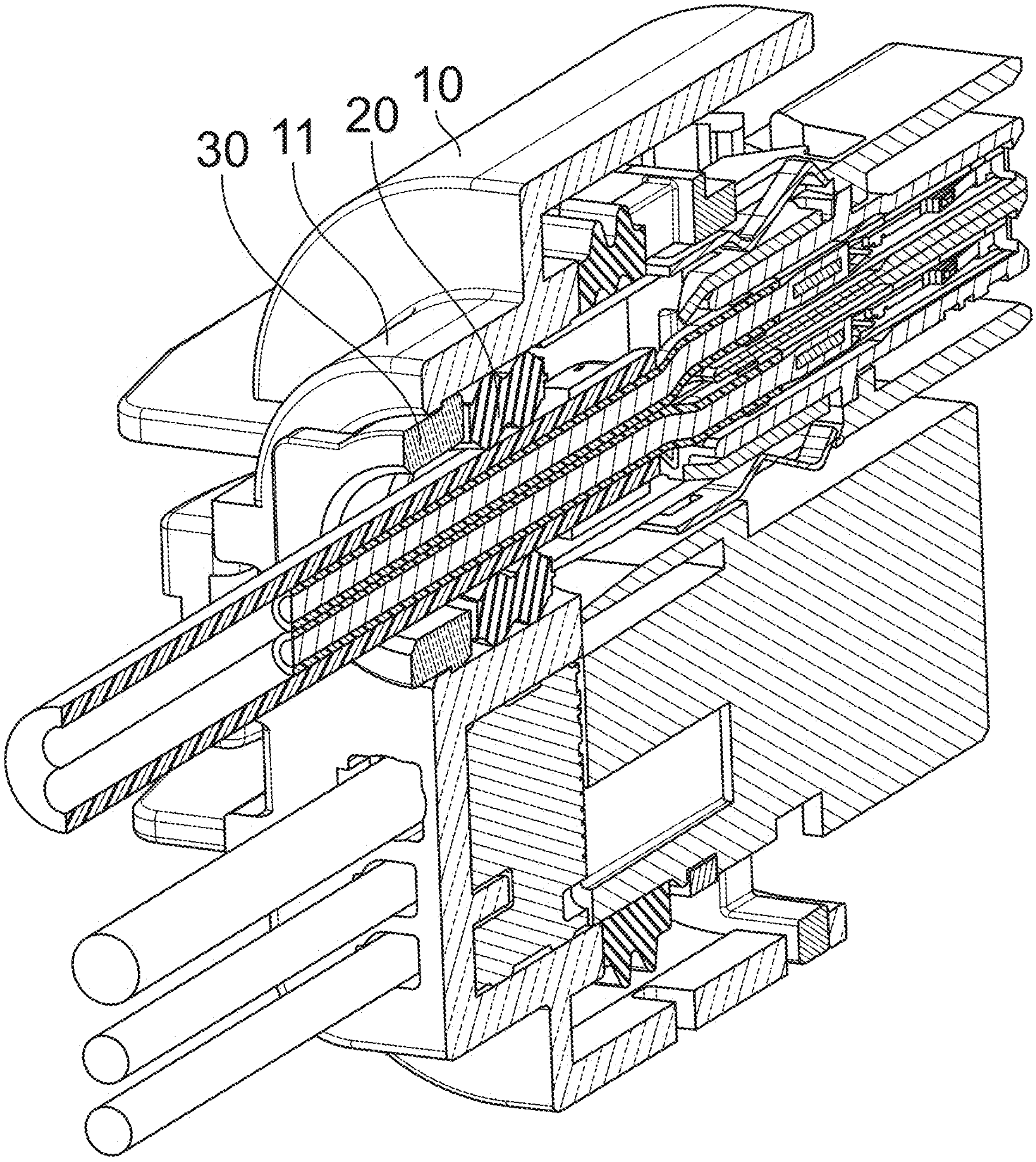
FIG. 3 is a sectional perspective view of the connector.
Figure 4:
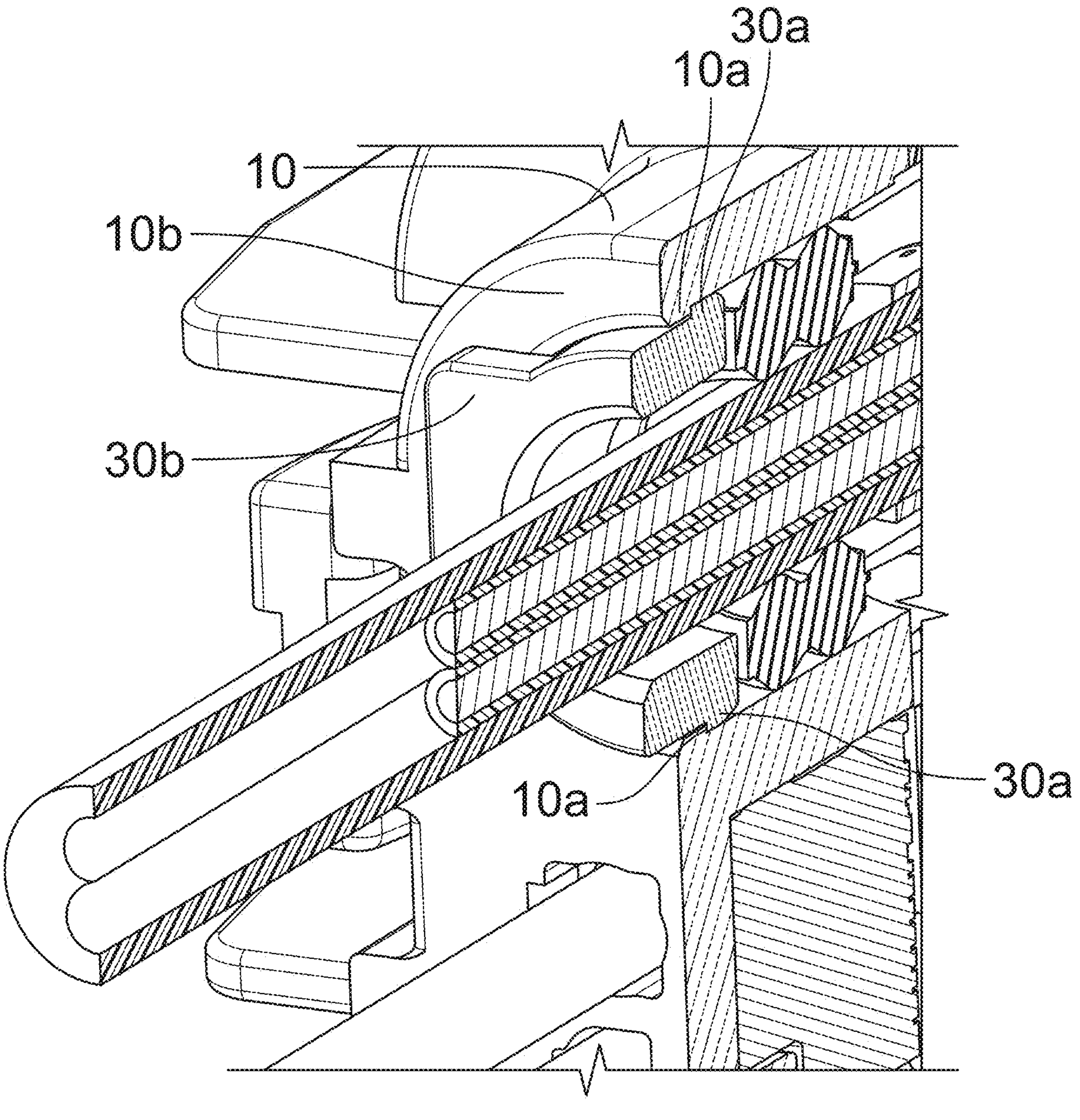
FIG. 4 is an enlarged view of the connector shown in FIG. 3.

As shown in FIG. 2, in the illustrated embodiment, the protection end cover 30 includes a body 31, a first flange 30*a*, and a second flange 30*b*. In the shown embodiment, the body 31 is cylindrical. The body 31 has a first end and a second end opposite to the first end in the axial direction of the body 31. The first end of the body 31 is inserted into the insertion hole 110 of the housing 10 of the connector, as shown in FIGS. 3 and 4. The second end of the body 31 is positioned outside the housing 10.

As shown in FIG. 5, a blocking part 10*a* is formed in the insertion hole 110 of the housing 10. The blocking part 10*a* engages with the first flange 30*a* of the protection end cover 30 to prevent the protection end cover 30 from being pulled out of the insertion hole 110. The insertion hole 110 has an opening at one end 11 of the housing 10, and the blocking part 10*a* may be a ring of radial flange formed on the inner surface of the opening of the insertion hole 110.

As shown in FIGS. 2, 4, 7, and 8, in the illustrated embodiment, the first flange 30*a* is formed on the outer peripheral surface of the first end of the body 31. The first flange 30*a* is used to engage with the blocking part 10*a* in the housing 10 to prevent the protection end cover 30 from being pulled out of the insertion hole 110. The second flange 30*b* is formed on the outer peripheral surface of the second end of the body 31. The second flange 30*b* is adapted to abut against the outer end face 10*b* of the housing 10 to limit the protection end cover 30 at a predetermined insertion position. In this way, it is possible to prevent the protection end cover 30 from being further inserted into the insertion hole 110 of the housing 10.

Figure 6:
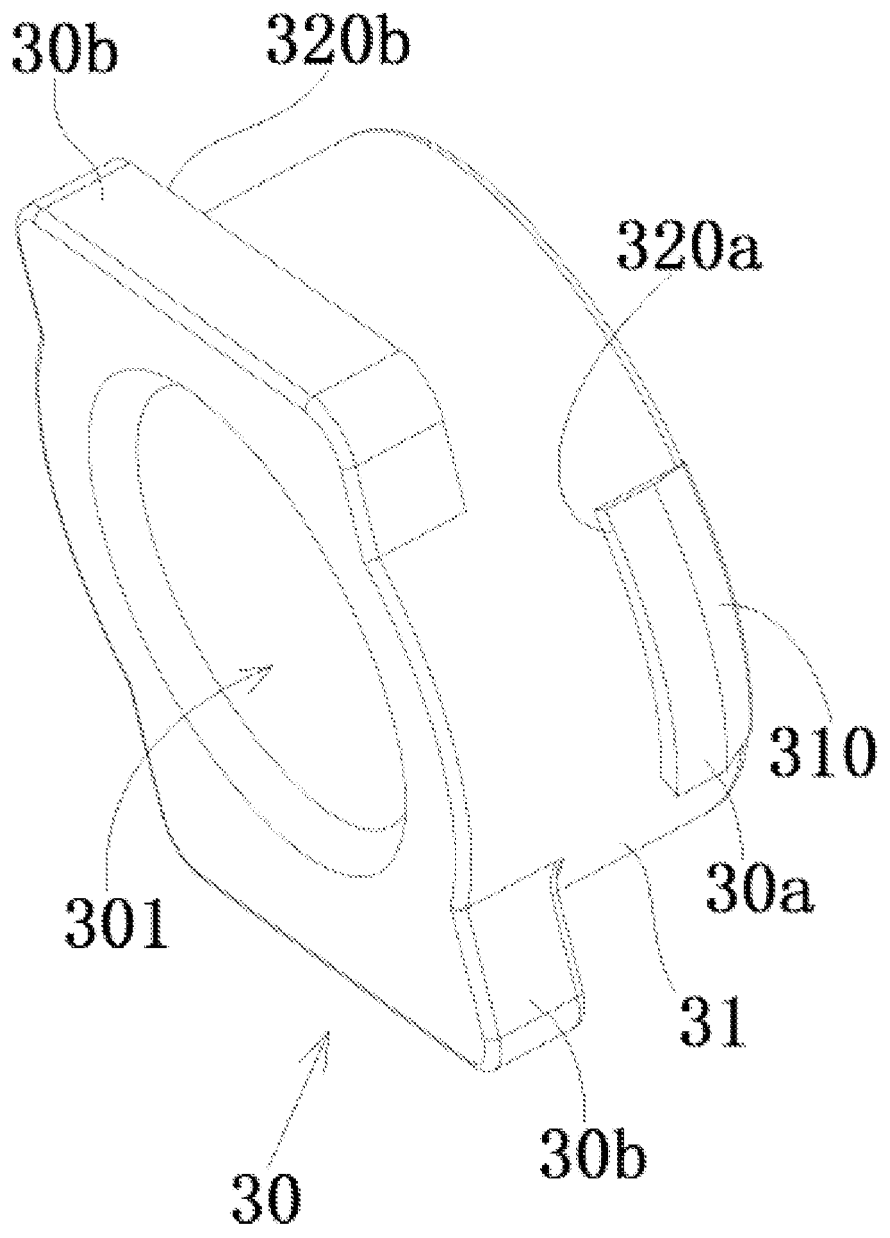
FIG. 6 is a perspective view of the protection end cover.
Figure 7:
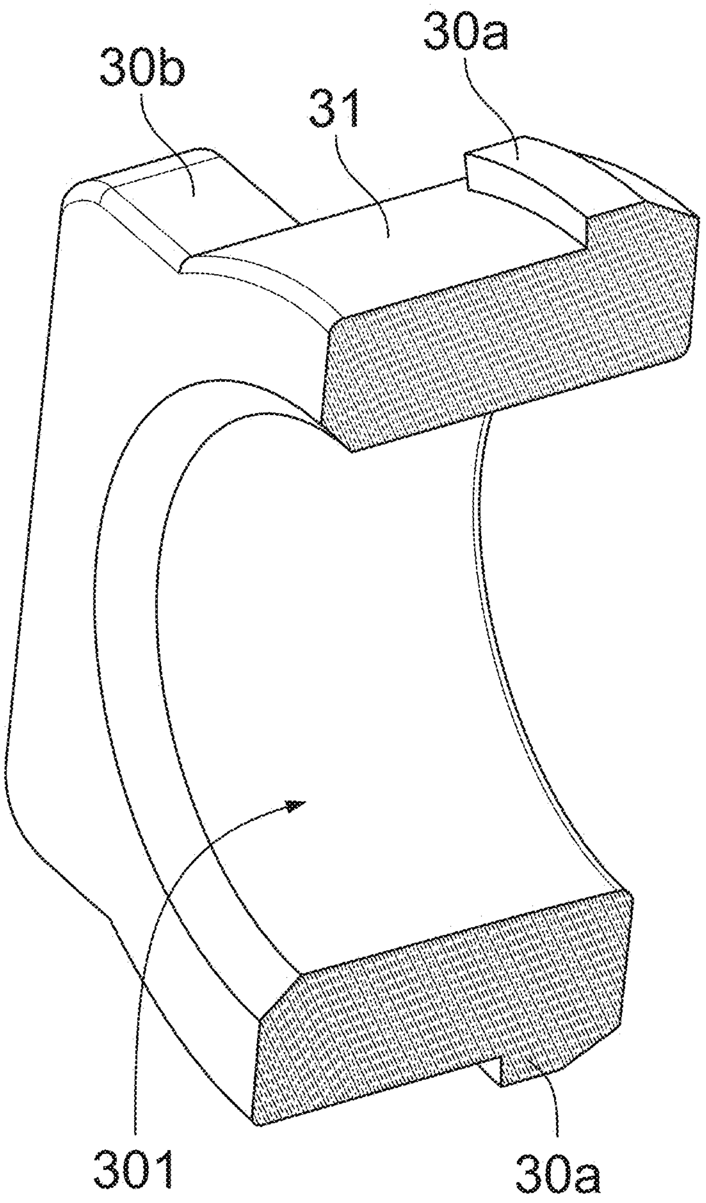
FIG. 7 is a sectional perspective view of the protection end cover.

The connector further comprises a cable 1, shown in FIG. 1. A cable through hole 301 extending in the axial direction is formed in the body 31 of the protection end cover 30 to allow the cable 1 to enter the insertion hole 110 of the housing 10 through the cable through hole 301, as shown in FIGS. 6 and 7. In the illustrated embodiment, the cable 1 may be an Ethernet signal cable for transmitting an Ethernet signal. The end face of the first end of the protection end cover 30 is adapted to abut against one end of the sealing ring 20 sleeved on the cable 1 to prevent the sealing ring 20 from being pulled out from the insertion hole 110 of the housing 10.

As shown in FIGS. 4 and 5, in the illustrated embodiment, the blocking part 10*a* in the housing 10 has a radial blocking surface. The first flange 30*a* of the protection end cover 30 has a first engagement surface 320*a*, shown in FIG. 6, adapted to abut against the radial blocking surface of the housing 10. The second flange 30*b* of the protection end cover 30 has a second engagement surface 320*b* adapted to abut against the outer end surface 10*b* of the housing 10. In order to facilitate installation and manufacturing, in an exemplary embodiment of the present invention, there is a predetermined distance between the first engagement surface 320*a* and the second engagement surface 320*b* in the axial direction. For example, the distance between the first engagement surface 320*a* and the second engagement surface 320*b* in the axial direction may be equal to or slightly greater than the distance between the radial blocking surface of the blocking part 10*a* and the outer end surface 10*b* of the housing 10 in the axial direction.

As shown in FIG. 6, in the illustrated embodiment, a guide slope 310 adapted to guide the first end of the protection end cover 30 into the insertion hole 110 is formed on the first flange 30*a*. Thus, the first end of the protection end cover 30 can be easily inserted into the insertion hole 110 of the housing 10.

As shown in FIGS. 6 and 7, in the illustrated embodiment, a plurality of first flanges 30*a* are formed on the first end of the body 31, and the plurality of first flanges 30*a* are arranged at intervals along the circumferential direction of the body 31. A plurality of second flanges 30*b* are formed on the second end of the body 31, and the plurality of second flanges 30*b* are arranged at intervals along the circumferential direction of the body 31. In the illustrated embodiment, two first flanges 30*a* are formed on the first end of the body 31, and two second flanges 30*b* are formed on the second end of the body 31. However, the number and shape of the first flange 30*a* and the second flange 30*b* are not limited to the illustrated embodiment, and may be reasonably set according to the actual application.

The outer diameter of the first flange 30*a* is slightly larger than the inner diameter of the insertion hole 110, so as to be interference fit with the insertion hole 110. The inner diameter of the insertion hole 110 at the blocking part 10*a* is smaller than that of other parts of the insertion hole 110. That is, the inner diameter of the blocking part 10*a* is smaller than the inner diameter of other parts of the insertion hole 110.

The inner diameter of the cable through hole 301 of the protection end cover 30 is larger than the outer diameter of the cable 1 passing through it, so that the cable 1 can pass through it easily.

As shown in FIGS. 6 and 7, in the illustrated embodiment, the first flange 30*a* and the second flange 30*b* are offset in the circumferential direction of the body 31, and the first flange 30*a* and the second flange 30*b* are spaced in the axial direction of the body 31.

As shown in FIG. 5, in the illustrated embodiment, the connector further includes an inner housing 40 and a pair of terminals 50. The inner housing 40 is installed in the housing 10, and the pair of terminals 50 are provided in the inner housing 40. One end of the cable 1 is electrically connected to the terminals 50. In the illustrated embodiment, the cable 1 and the pair of terminals 50 are used for transmitting, for example, Ethernet signals. In the illustrated embodiment, the connector further includes an electromagnetic shield 60. The electromagnetic shield 60 at least partially surrounds the pair of terminals 50 in the circumferential direction, and is used to prevent the pair of terminals 50 from being subjected to electromagnetic interference, for example, to prevent the pair of terminals 50 from being subjected to interference from a power supply terminal of the connector. In an embodiment, in addition to the terminal 50 for transmitting Ethernet signals, the connector also includes a power terminal for transmitting power and a signal terminal for transmitting other signals (such as CAN signals).

As shown in FIG. 5, in the illustrated embodiment, one end of the electromagnetic shield 60 is crimped on the shielding layer of the cable 1, and the other end of the electromagnetic shield 60 at least partially surrounds the pair of terminals 50. The other end of the electromagnetic shield 60 is adapted to mate with a mating electromagnetic shield of a mating connector.

In another embodiment, a connector assembly includes the aforementioned connector and a mating connector adapted to mate with the aforementioned connector.

In the foregoing exemplary embodiments according to the present invention, the protection end cover 30 is fixed to the housing 10 by the flanges 30*a*, 30*b* on both ends thereof, so that the structure of the protection end cover 30 and the housing 10 can be simplified, the volume of the connector can be reduced, and the manufacturing cost of the connector can be decreased.

It should be appreciated for those skilled in this art that the above embodiments are intended to be illustrative, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A protection end cover for a sealing ring, comprising:

a body having a first end insertable into an insertion hole of a housing of a connector and a second end positioned outside the housing;

a first flange on a first outer peripheral surface of the first end of the body, the first flange engaging with a blocking part of the housing to prevent the protection end cover from being pulled out of the insertion hole, an outer diameter of the first flange is slightly larger than an inner diameter of the insertion hole and the first flange is interference fit with the insertion hole, the inner diameter of the insertion hole at the blocking part is smaller than the inner diameter of other parts of the insertion hole; and a second flange on a second outer peripheral surface of the second end of the body.

2. The protection end cover of claim 1, wherein a cable through hole extending in an axial direction of the body is formed in the body of the protection end cover, a cable enters the insertion hole of the housing through the cable through hole.

3. The protection end cover of claim 2, wherein an end face of the first end abuts against an end of a sealing ring sleeved on the cable and prevents the sealing ring from being pulled out from the insertion hole of the housing.

4. The protection end cover of claim 1, wherein the first flange has a first engagement surface abutting against the blocking part, the second flange has a second engagement surface abutting against the outer end surface of the housing, the first engagement surface and the second engagement surface are spaced by a predetermined distance in an axial direction of the body.

5. The protection end cover of claim 1, wherein the first flange has a guide slope guiding the protection end cover into the insertion hole.

6. The protection end cover of claim 1, wherein the first flange is one of a plurality of first flanges formed on the first end of the body, the plurality of first flanges are arranged at intervals along a circumferential direction of the body, and the second flange is one of a plurality of second flanges formed on the second end of the body, the plurality of second flanges are arranged at intervals along the circumferential direction of the body.

7. The protection end cover of claim 2, wherein an inner diameter of the cable through hole of the protection end cover is larger than an outer diameter of the cable.

8. The protection end cover of claim 1, wherein the first flange and the second flange are offset in a circumferential direction of the body, and the first flange and the second flange are spaced in an axial direction of the body.

9. A connector, comprising:

a housing having an insertion hole with an opening at an outer end surface of the housing;

a sealing ring inserted into the insertion hole; and a protection end cover inserted into the opening of the insertion hole and fixed to the housing, the protection end cover includes:

a body having a first end insertable into the insertion hole and a second end positioned outside the housing;

a first flange on a first outer peripheral surface of the first end of the body, the first flange engaging with a blocking part of the housing to prevent the protection end cover from being pulled out of the insertion hole, the blocking part is formed in the insertion hole of the housing for engaging with the first flange of the protection end cover to prevent the protection end cover from being pulled out of the insertion hole, the blocking part is a ring of radial flange formed on an inner surface of the opening of the insertion hole; and a second flange on a second outer peripheral surface of the second end of the body, the second flange abutting against the outer end surface of the housing to limit the protection end cover at a predetermined insertion position, the sealing ring is moved toward the outer end face of the housing, the first end of the protection end cover abuts against one end of the sealing ring to prevent the sealing ring from being pulled out from the insertion hole.

10. The connector of claim 9, wherein the blocking part has a radial blocking surface, the first flange has a first engagement surface abutting against the radial blocking surface, and the second flange has a second engagement surface abutting against the outer end surface of the housing, a distance between the first engagement surface and the second engagement surface in an axial direction of the insertion hole is equal to or slightly larger than a distance between the radial blocking surface of the blocking part and the outer end surface of the housing in the axial direction.

11. The connector according to claim 9, further comprising a cable passing through a cable through hole of the protection end cover and inserted into the insertion hole, the sealing ring is sleeved on the cable and pressed between an inner wall of the insertion hole and the cable to seal between the inner wall of the insertion hole and the cable.

12. The connector according to claim 11, wherein a terminal is connected to an end of the cable, the cable and the terminal are used to transmit Ethernet signals.

13. The connector according to claim 11, further comprising:

an inner housing at least partially received in the housing; and a terminal inserted into the inner housing and electrically connected to an end of the cable.

14. The connector according to claim 9, further comprising an electromagnetic shield at least partially surrounding a terminal of the connector in a circumferential direction.

15. The connector according to claim 14, wherein a first end of the electromagnetic shield is crimped on a shielding layer of a cable, and a second end of the electromagnetic shield is matable with a mating electromagnetic shield of a mating connector.

16. The connector according to claim 9, wherein the blocking part has a radial blocking surface abutting against a first engagement surface of the first flange, the outer end surface abuts against a second engagement surface of the second flange.

17. A connector assembly, comprising:

the connector according to claim 9; and a mating connector mating with the connector.

* * * * *